(12) United States Patent
Rogers

(10) Patent No.: US 7,249,519 B2
(45) Date of Patent: Jul. 31, 2007

(54) PRESSURE GAUGE

(75) Inventor: John Anthony Rogers, Dorset (GB)

(73) Assignee: ITW Limited, Swansea (GB)

( * ) Notice: Subject to any disclaimer, the term of this patent is extended or adjusted under 35 U.S.C. 154(b) by 208 days.

(21) Appl. No.: 11/186,783

(22) Filed: Jul. 22, 2005

(65) Prior Publication Data

US 2005/0252993 A1  Nov. 17, 2005

Related U.S. Application Data

(62) Division of application No. 10/457,537, filed on Jun. 10, 2003.

(30) Foreign Application Priority Data

Jun. 18, 2002 (GB) ................................ 0213913.7

(51) Int. Cl.
G01L 9/00 (2006.01)
B05B 7/00 (2006.01)

(52) U.S. Cl. ........................................ 73/754; 239/526
(58) Field of Classification Search ................. 73/754; 239/526

See application file for complete search history.

(56) References Cited

U.S. PATENT DOCUMENTS

| 1,806,192 | A |  | 5/1931 | Collins |
| 3,482,781 | A |  | 12/1969 | Sharpe |
| 4,139,278 | A |  | 2/1979 | Matsumoto et al. |
| 5,119,992 | A |  | 6/1992 | Grime |
| 5,190,219 | A | * | 3/1993 | Copp, Jr. ..................... 239/296 |
| 5,191,797 | A |  | 3/1993 | Smith |
| 5,281,782 | A | * | 1/1994 | Conatser ..................... 200/83 J |
| 5,485,857 | A |  | 1/1996 | Amundsen |
| 5,546,810 | A |  | 8/1996 | Arikawa et al. |
| 6,394,977 | B1 |  | 5/2002 | Taylor et al. |
| 6,460,787 | B1 |  | 10/2002 | Hartle et al. |
| 6,585,173 | B2 |  | 7/2003 | Schmon et al. |
| 7,017,838 | B2 | * | 3/2006 | Schmon ....................... 239/526 |

FOREIGN PATENT DOCUMENTS

| DE | 10031858 | 9/2003 |
| DE | 10031857 | 10/2003 |
| EP | 0526525 | 3/1993 |

* cited by examiner

*Primary Examiner*—Edward Lefkowitz
*Assistant Examiner*—Jermaine Jenkins

(57) ABSTRACT

A retrofittable pressure gauge for a spray gun includes a pressure sensor, located in a pressure chamber, a power source and a display unit, all enclosed within a case, a passageway providing fluid communication between the pressure chamber and a pressurised interior space of the spray gun when the gauge is mounted on the spray gun and a mounting fixture configured for mounting the pressure gauge at a spreader valve or a trigger operated fluid valve of the spray gun.

16 Claims, 8 Drawing Sheets

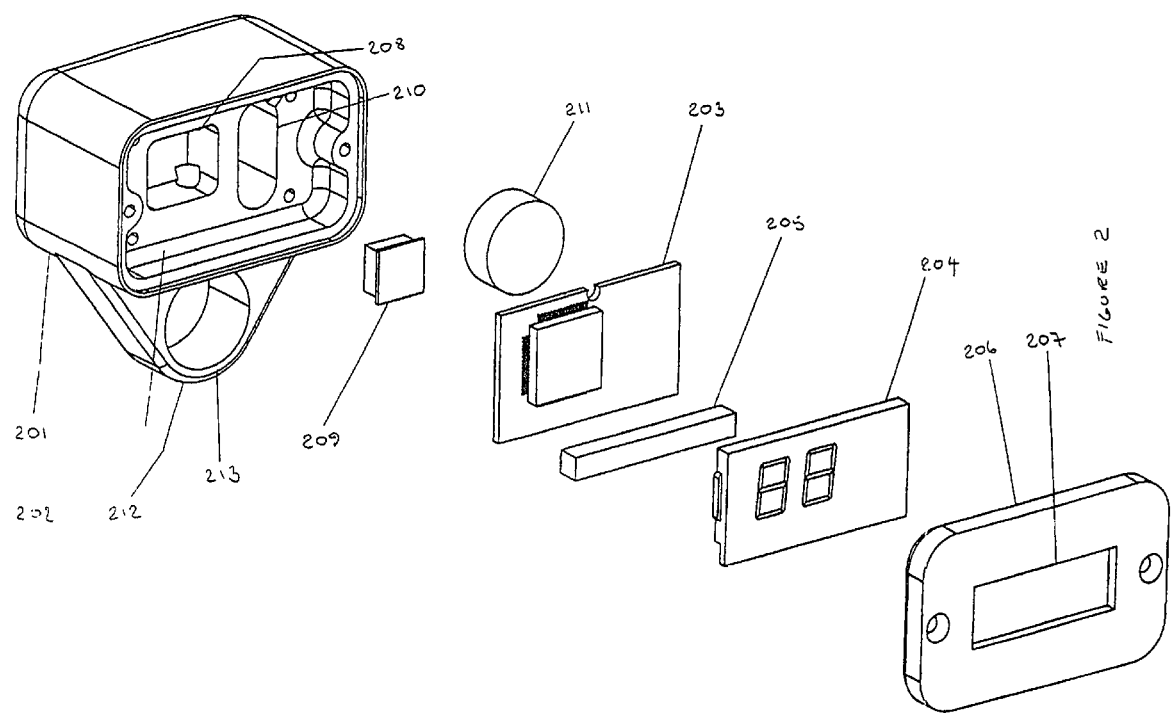

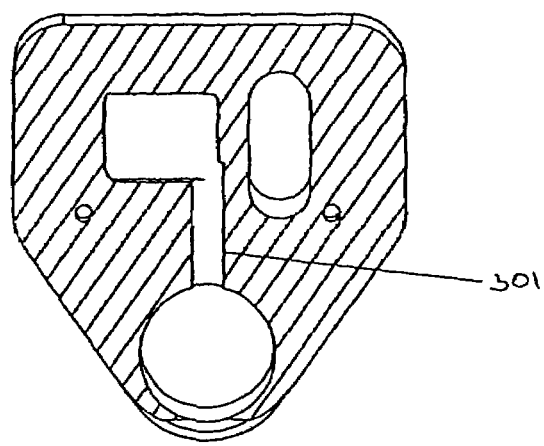
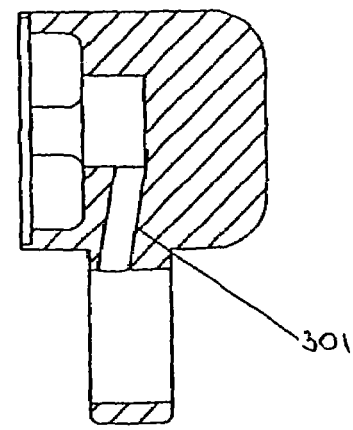
FIGURE 3a
FIGURE 3b
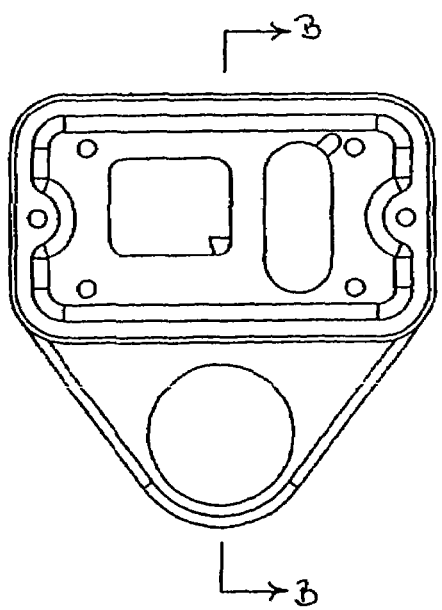
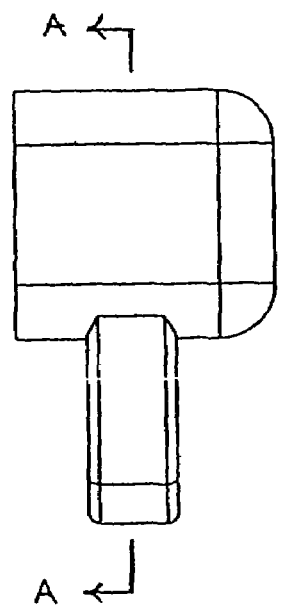
FIGURE 3c
FIGURE 3d

PRESSURE GAUGE

RELATED APPLICATIONS

This application is a divisional of U.S. application Ser. No. 10/457,537, filed Jun. 10, 2003.

FIELD OF THE INVENTION

This invention relates to an air pressure gauge, preferably a digital air pressure gauge, adapted to be retrofitted to a compressed air spray gun and a compressed air spray gun comprising the said air pressure gauge. In particular the invention discloses an air pressure gauge adapted to be retrofitted to a compressed air spray gun at a location down stream of a compressed air inlet pressure reducing valve or trigger operated shut off valve.

BACKGROUND TO THE INVENTION

Traditionally the compressed air inlet pressure of a compressed air spray gun is adjusted to suit a particular compressed air spray gun air cap or spraying medium by a compressed air pressure reducing valve and air pressure gauge mounted upstream of the compressed air inlet, mounted either adjacent to the source of the compressed air near a spray booth or mounted pendant of the handle of the compressed air spray gun. One problem associated with the aforementioned arrangements of air pressure gauge and compressed air spray gun is that the location of the air pressure gauge is such that the air pressure upstream of the compressed air pressure reducing valve is measured. It is preferable to measure the air pressure downstream of the compressed air pressure reducing valve and all other compressed air valves which can affect a variable pressure reduction and lead to inconsistent compressed air pressure reaching the air cap.

It is possible for a compressed air inlet pressure reducing valve to be included as part of the spray gun thus eliminating the need for a separate compressed air pressure reducing valve, however a problem with this arrangement is that there is at present no means of displaying the compressed air pressure, and if a separate compressed air pressure reducing valve is used upstream with an air pressure gauge, the pressure reducing valve is downstream and if not fully open can cause the pressure setting to vary.

A solution to the aforementioned problem is provided by EP 526 525 which discloses a compressed air spray gun comprising a miniature digital electronic air pressure gauge located down stream of the compressed air inlet pressure reducing valve for measuring the air pressure at the air cap and downstream of the trigger operated shut off valve. As such compressed air spray guns are often used in hazardous areas, the air pressure gauge comprises a sealed unit with an aperture leading to a pressure sensitive transducer connected to an amplifier. The signal from the amplifier is input to an analogue digital converter and thence to a decoder/driver and display. On exhaustion of the cell powering the amplifier, the sealed unit is discarded and replaced with a new sealed unit.

The miniature digital electronic air pressure gauge of EP 526 525 is threaded into a threaded aperture bored into the compressed air spray gun. The air pressure gauge is arranged to be in communication with a bore leading to a region downstream of the compressed air inlet pressure reducing valve and downstream of the trigger operated shut off valve.

A similar solution is offered by the ITW OMX-610 spray gun except the threaded aperture receives an analogue pressure gauge and communicates with a region downstream of the compressed air inlet pressure reducing valve but upstream of the trigger operated shut off valve.

DE 100 31 857 A and DE 100 31 858 A disclose spray guns comprising pressure gauges which are integrated into respectively the handle of the spray gun and the compressed air inlet valve. Embodiments are disclosed with the compressed air pressure being measured upstream of the compressed air inlet, between the compressed air inlet pressure reducing valve and the trigger operated shut off valve and downstream of both the compressed air inlet pressure reducing valve and the trigger operated shut off valve.

Given the foregoing, a need has been identified to provide an air pressure gauge which can be retrofitted to a wide range of existing compressed air spray guns without the need to modify the compressed air spray gun body and thereby measure the air pressure downstream of a compressed air inlet pressure reducing valve and trigger operated shut off valve where the mounting of the gauge does not affect the ease of use of the existing spray gun controls.

SUMMARY OF THE INVENTION

In a first aspect, the invention provides a retrofittable pressure gauge for a spray gun comprising a pressure sensor, located in a pressure chamber, a power source and a display unit, all enclosed within a case, a passageway providing fluid communication between the pressure chamber and a pressurised interior space of a spray gun when the gauge is mounted on a spray gun and a means for attachment to a spray gun, wherein the means for attachment comprises a mounting fixture configured for mounting the pressure gauge at a spreader valve or a trigger operated fluid valve of a spray gun. The mounting fixture can comprise a mounting fixture bore through which at least a part of the spreader valve or trigger operated fluid valve can pass thereby mounting the pressure gauge at the spreader valve or the trigger operated fluid valve. The passageway can provide fluid communication between the pressure chamber and the mounting fixture bore. Furthermore the mounting fixture bore and the part of the spreader valve or trigger operated fluid valve which can pass through the mounting fixture bore can define an annular space in communication with the passageway.

The pressure gauge can comprise an analogue or digital pressure gauge. The pressure gauge optionally comprises a movement detector switch which activates the pressure sensor only when the pressure gauge is subject to movement.

In one preferred embodiment, the pressure sensor comprises a semiconductor strain device. Typically the display unit is a liquid crystal display. The pressure gauge preferably further comprises a printed circuit board mounting a microprocessor.

In a second aspect of the invention, a kit is provided comprising the pressure gauge hereinbefore described and a spreader valve bushing or a trigger operated fluid valve bushing, the spreader valve bushing or trigger operated fluid valve bushing comprising a channel, in substantial alignment with the longitudinal axis of the spreader valve bushing or trigger operated fluid valve bushing, which, when the spreader valve bushing or trigger operated fluid valve bushing is fitted into a spray gun, allows fluid communication between the pressurised interior space and the annular space.

In a third aspect of the invention, a spray gun is provided comprising the pressure gauge hereinbefore described.

BRIEF DESCRIPTION OF THE FIGURES

Embodiments of the present invention will now be described with reference to the figures in which:

FIG. 2 shows an exploded view of a digital electronic air pressure gauge according to the invention;

FIGS. 3a-3d show respectively a view on A-A indicated in FIG. 3d, a view on B-B indicated on FIG. 3c, a front view and a side view facing left of a case of a digital electronic air pressure gauge according to the invention;

DETAILED DESCRIPTION OF PREFERRED EMBODIMENTS

Figure 1:
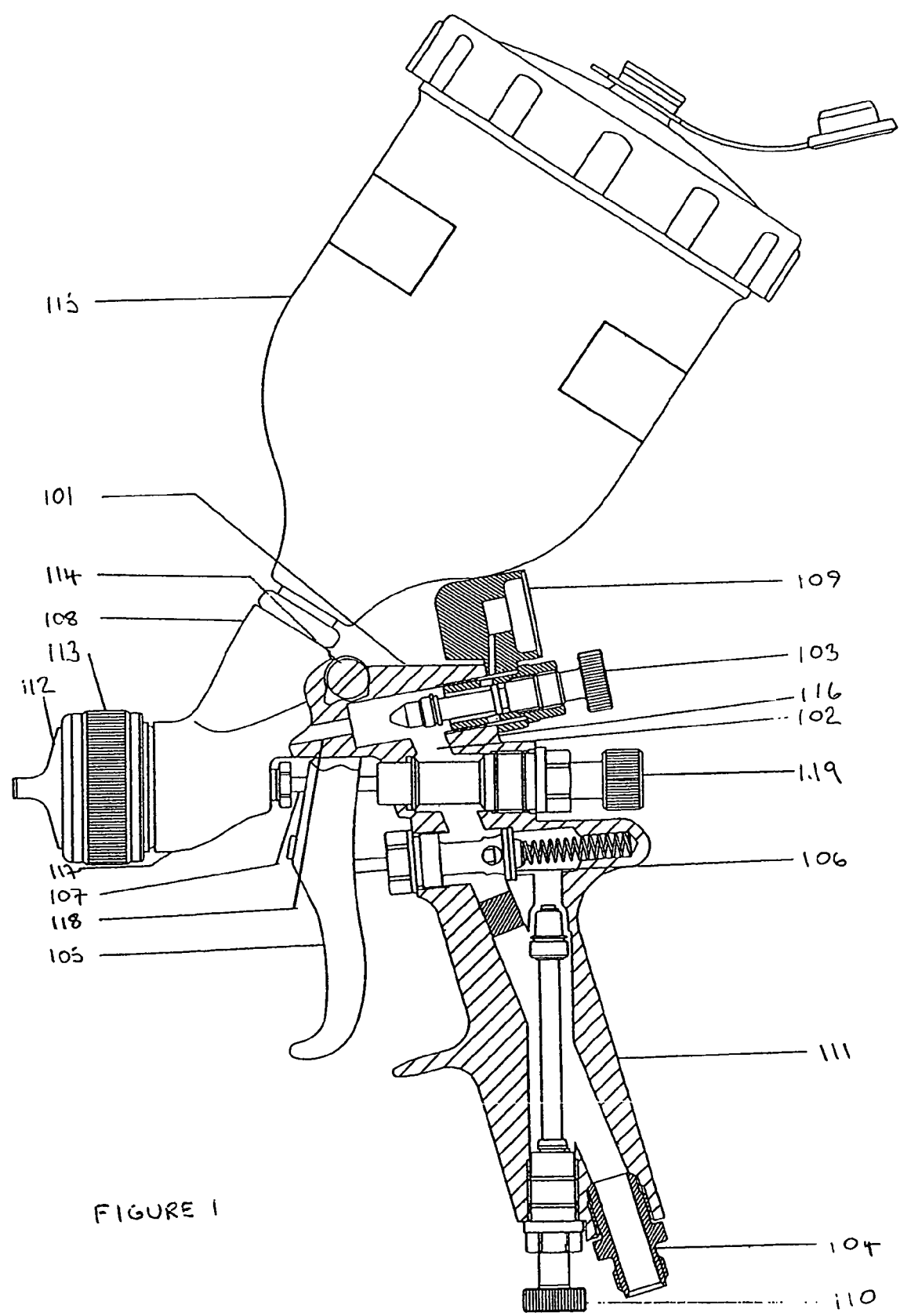
FIG. 1 shows a side view of a partly sectioned compressed air spray gun comprising a digital electronic air pressure gauge according to the invention attached to the compressed air spray gun at a spreader valve.

FIG. 1 shows a spray gun comprising a gun body 101, defining an interior space 102 through which compressed air can be passed, having an integral handle 111 depending from adjacent a first end of the gun body 116 and an air cap 112 secured to an opposing second end of the gun body 117 by a retaining ring 113.

A trigger 105 is secured to the gun body 101 by a screw 114 to pivot towards the handle 111 when manually squeezed to turn on the spray gun. A fluid reservoir 115 is reversibly attached to a fluid inlet 108 protruding from an upper part of the gun body 101. A compressed air hose (not shown) is reversibly attached to a compressed air inlet 104 located on an end of the handle 111 remote from the gun body 101.

The volume of compressed air entering the spray gun is controlled by a compressed air inlet pressure reducing valve 110 operating within the handle 111 of the spray gun. During use, as the trigger 105 is manually squeezed, compressed air from the compressed air hose (not shown) passes up through the handle 111 and through a trigger operated shut off valve 106, located in the first end of the gun body 116, into the interior space 102 of the gun body 101. The interior space 102 communicates separately with atomisation air outlets (not shown) and spray pattern shaping air outlets (not shown) in the air cap 112 by respectively, an atomising air passage (not shown) and a spray pattern shaping air passage 118. During use, the volume of compressed air in the interior space 102 which passes through the spray pattern shaping air passage 118 to the spray pattern shaping air outlets (not shown) is controlled by a spreader valve 103, also located in the first end of the gun body 116.

On manually squeezing the trigger 105, a trigger operated fluid valve 107 is also opened permitting fluid, such as a paint, to pass from the fluid reservoir 115 through the fluid inlet 108 into a fluid passage (not shown) within the gun body 101 and out through a fluid discharge orifice (not shown) as a stream. Compressed air exiting the atomising air outlets atomises the fluid into particles as the stream of fluid leaves the fluid discharge orifice (not shown) producing a spray of atomised fluid particles. Compressed air exiting the spray pattern shaping air outlets (not shown) controls the shape of the said spray of atomised fluid droplets.

An adjustable threaded end cap 119 sited at the first end of the gun body 116 regulates the maximum volume of fluid which can pass through the fluid discharge orifice (not shown) by acting as a stop on the degree to which the trigger operated fluid valve 107 can be opened.

A pressure gauge 109 is secured to the first end of the gun body 116 by the spreader valve 103 thereby to measure the air pressure downstream of the compressed air inlet pressure reducing valve 110.

The pressure gauge 109 comprises a case 201, as shown in FIG. 2, including a recess 202, set into a side wall of the case 201, for a printed circuit board (PCB) 203 mounting a single chip microprocessor. The PCB 203 is operatively linked to a two digit, seven segment liquid crystal display (LCD) 204 by a contact strip 205. A cover 206 is provided for the recess 202 comprising a window 207 through which the LCD 204 may be viewed.

In the floor of the recess 202 are set a first well 208 for a pressure transducer 209, and a second well 210 for a battery 211, the pressure transducer 209 and the battery 211 being independently operatively linked to the PCB 203. The pressure transducer 209 is controlled by the PCB mounted microprocessor. The first well 208 and the pressure transducer 209 together define a pressure chamber (not shown).

The case 201 additionally comprises a mounting fixture 212 pendant from a lower surface of the case 201, the mounting fixture 212 comprising a mounting fixture bore 213 substantially in alignment with the LCD 204 axis of view. The case 201 also comprises an air passage 301, as shown in FIGS. 3a and 3b, providing communication between the first well 208 and the mounting fixture bore 213.

Figure 4:
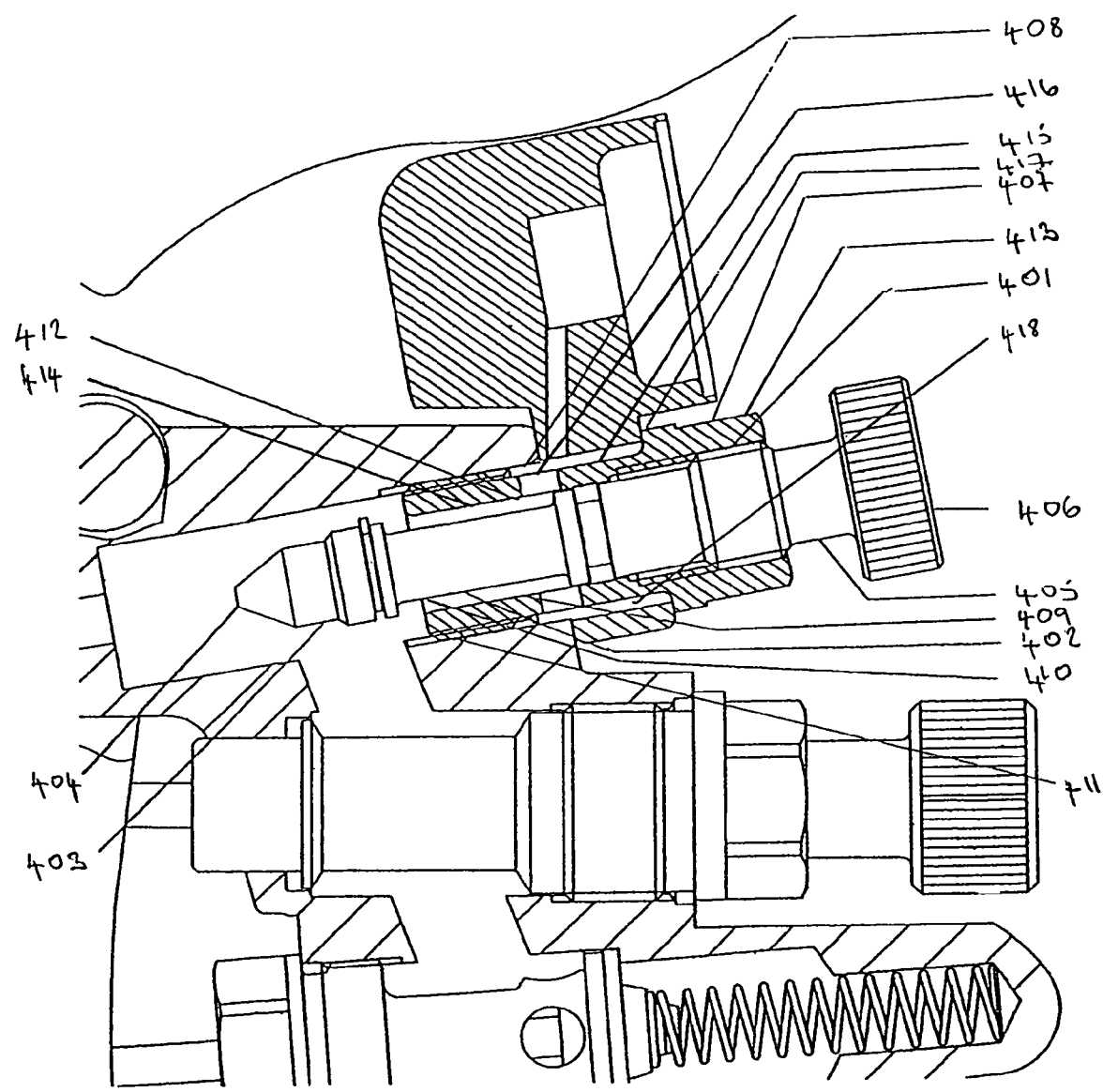
FIG. 4 shows a part sectional view of part of a compressed air spray gun illustrating a digital electronic air pressure gauge according to the invention mounted on a compressed air spray gun at a spreader valve.

FIG. 4 shows a detail of the mounting of the pressure gauge 109 onto the first end 116 of the gun body 101 by the spreader valve 103. The spreader valve 103 comprises a male thread 401 on part of an exterior surface of a shank 402, the shank 402 terminating at a first end 403 with a tip 404, which can progressively block the entrance to the spray pattern shaping air passage 118, and at a second end 405 by a knurled nut 406 rotation of which rotates the shank 402 causing translation of the tip 404 thereby blocking the said entrance. The male thread 401 are located approximately between the knurled nut 406 and a point midway between the knurled nut 406 and the tip 404.

The spreader valve 103 additionally comprises a spreader valve bushing 407, comprising a female thread (not shown) located on an inside surface 414 of the spreader valve bushing 407, in which the shank 402 is retained by interaction between the female thread (not shown) and the male thread 401. The spreader valve bushing 407 is threaded into a threaded aperture 408 bored into the first end 116 of the gun body 101 terminating at the interior space 102. The spreader valve bushing 407 is provided with an annular channel 409 formed on the inside surface 414 substantially in axial alignment with the longitudinal axis of the spreader valve bushing 407. A first end 410 of the annular channel 409 terminates at a first end 411 of the spreader valve bushing 407 located within the aperture 408 and a second end 412 of the annular channel 409 terminates approximately mid-way between the first end 411 and a second end 413 of the spreader valve bushing 407. The second end 412 of the annular channel 409 communicates with an opening 416 through the spreader valve bushing 407 connecting the inside surface 414 and outside surface 415 of the spreader valve bushing 407. The female thread (not shown) lies approximately between the second end 413 of the spreader valve bushing 407 and a point midway between the first end 411 and second end 413 of the spreader valve bushing 407.

The pressure gauge 109 is mounted onto the spray gun by passing the spreader valve bushing 407 through the mounting fixture bore 213 of the pressure gauge 109 and threading the spreader valve bushing 407 into the threaded aperture 408. The pressure gauge 109 is thereby clamped between a first surface defined by the exterior surface of the gun body adjacent the aperture 408 and a second surface defined by a spreader valve bushing shoulder 417. The spreader valve bushing 407 and shank 402 of the spreader valve 103 are adapted to be longer in the present invention than typically used when not mounting the pressure gauge 109 of the invention. In another embodiment, the spreader valve bushing 407 and shank 402 of the spreader valve 103 remain unchanged in length in the present invention. In the latter case, only the spreader valve bushing 407 need be adapted and modified to mount the pressure gauge 109 to the spray gun by, for example, the provision of a removable ring located between the knurled nut 406 and the second end 413 of the spreader valve bushing 407. The pressure gauge 109 is mounted on the spray gun in place of the removable ring.

Furthermore, the inside diameter of the mounting fixture bore 213 is larger than the outside diameter of the spreader valve bushing 407 thereby creating a spreader valve annular space 418 between the opposing surfaces defined by the inside surface of the mounting fixture bore and the outside surface of the bushing 415.

On mounting the pressure gauge as described hereinabove, compressed air in the interior space 102 can pass through the channels 409 formed on the inside surface 414 of the spreader valve bushing 407 and through the openings 416 and thence through the air passage 301, via the spreader valve annular space 418, into the first well 208 of the pressure gauge 109 wherein resides the pressure transducer 209.

The pressure transducer 209 comprises a semiconductor strain gauge device bonded to a glass substrate mounted on a ceramic base whose characteristics change when subjected to a physical strain induced by, in this case, compressed air. The pressure transducer 209 generates a signal which is input to the PCB mounted microprocessor which includes an analogue digital convertor. The output of the PCB mounted microprocessor is fed to the LCD 204 which indicates the measured air pressure.

The pressure gauge 109 operates in the following manner. The pressure gauge 109 can be in any one of two operational states, namely an active mode and an idle mode. In the active mode, the pressure gauge 109 actively measures and displays the current compressed air pressure. Should the compressed air pressure remain at zero for longer than a predetermined period, the pressure gauge 109 will then automatically switch to the idle mode, in order to conserve battery 211 life, at which point the LCD 204 will go blank. In the idle mode, the PCB mounted microprocessor will activate the pressure transducer 209 for a short period at regular intervals. If a compressed air pressure above atmospheric pressure is detected, the pressure gauge 109 will immediately switch to the active mode again.

To further increase the life of the battery 211, the pressure gauge 109 can additionally comprise a movement detector (not shown in FIG. 2) which signals the microprocessor to de-energise the pressure transducer 209 after the spray gun has been stationary for a predetermined period thereby conserving battery life. When the spray gun is moved, the movement detector (not shown) detects this movement and signals the microprocessor to energise the pressure transducer 209.

Figure 5A:
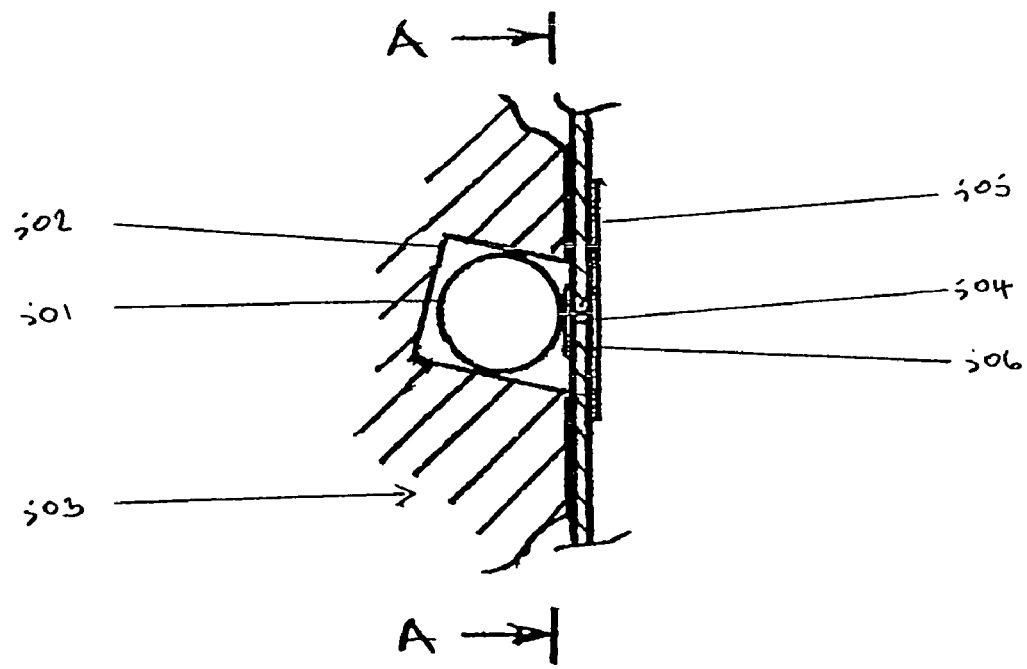
FIGS. 5a-5b show respectively a side view of a sectioned and a view on A-A indicated in FIG. 5a of part of a movement detector switch of a digital electronic air pressure gauge according to the invention.
Figure 5B:
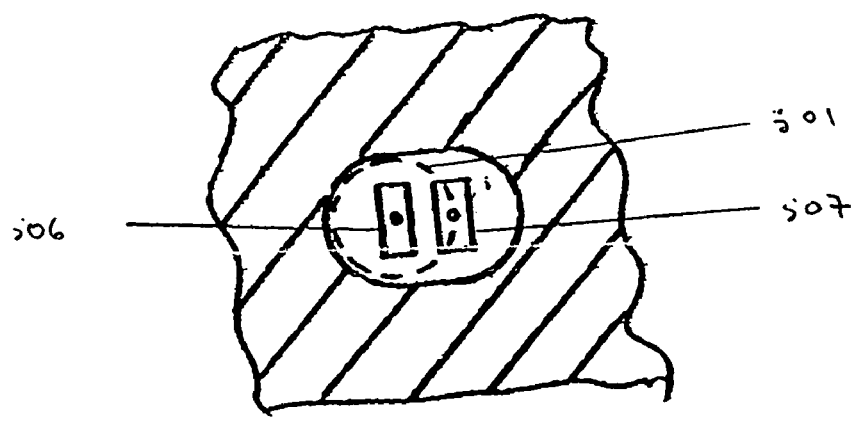

A suitable movement detector switch, shown in FIGS. 5a and 5b, comprises a metal ball 501 trapped in a slot 502 set into the surface of a metal housing 503, an open side of the slot 502 covered by the PCB 203. FIG. 5a shows that the PCB 203 comprises a first through contact hole 504 permitting electrical contact between a first copper track 505 and a first copper contact pad 506. In FIG. 5b a second copper contact pad 507 is shown adjacent the first copper contact pad 506, the second copper contact pad 507 in electrical contact with a second copper track (not shown) via a second through contact hole (not shown). The slot 502 is shown in FIG. 5A angled slightly downwardly to ensure the metal ball 501 remains in contact with at least one of the first or second copper contact pads 506, 507 when the spray gun is held upright with the trigger operated fluid valve 107 in a horizontal position.

The metal ball 501 completes a first and second electric circuit between respectively the first 506 or second 507 copper contact pad and the metal housing 503 thereby producing input signals to the single chip microprocessor mounted on the PCB 203. The metal ball 501 can either complete the first electric circuit between the first copper contact pad 506 and the metal housing 503, or the second electric circuit between the second copper contact pad 507 and the metal housing 503 depending on the location within the slot 502 of the metal ball 501. When the spray gun is being used, the metal ball 501 can move within the slot 502 successively completing the first and second electric circuits. Completion of each electric circuit generates different input signals which the single chip microprocessor recognises. When the microprocessor receives successive alternating inputs from each of the two circuits, the microprocessor energises the pressure transducer 209. When the alternating input signals cease for a predetermined time, due to the spray gun being motionless, the microprocessor de-energises the pressure transducer 209.

Figure 6A:
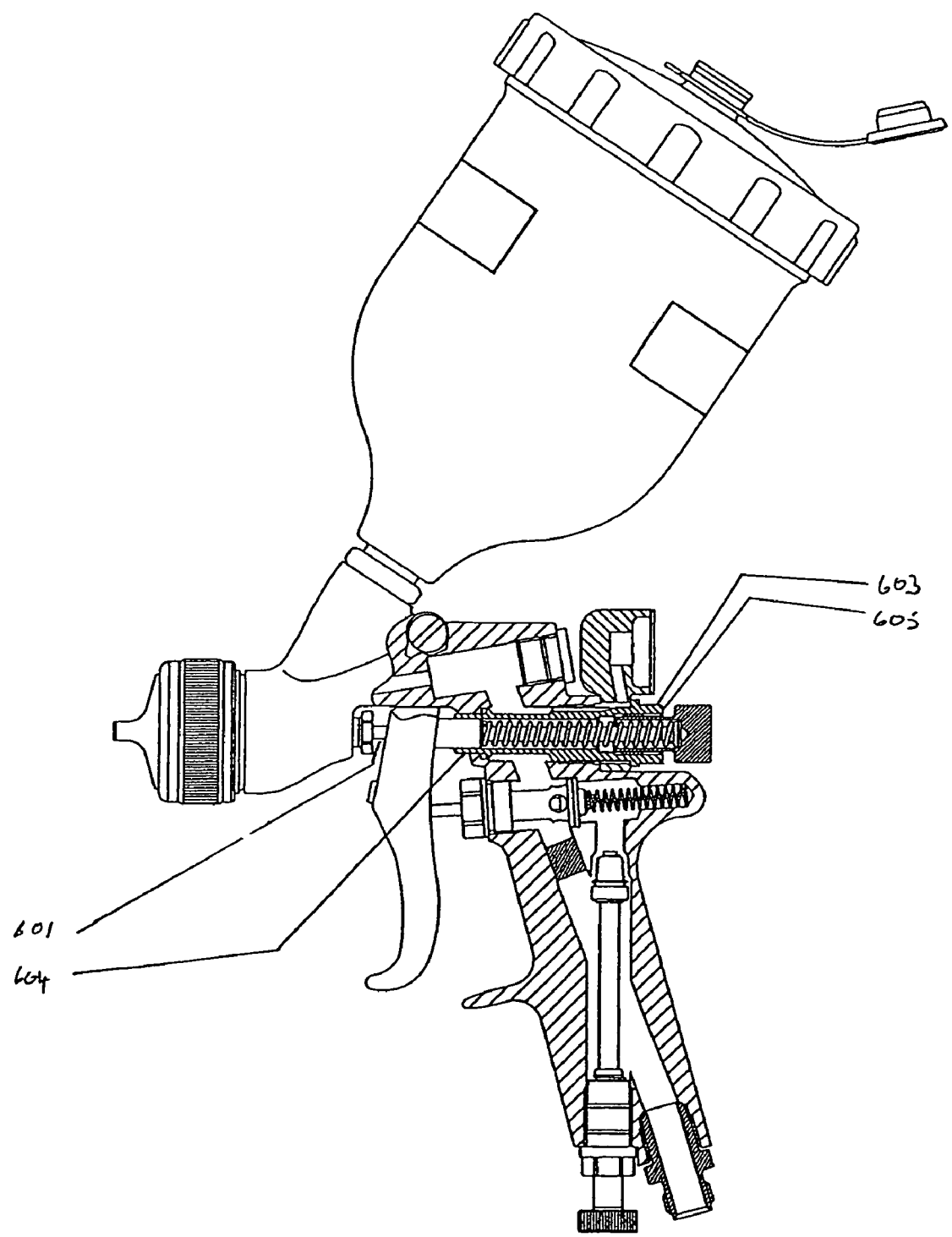
FIGS. 6a-6b show respectively a side view of a partly sectioned compressed air spray gun and a part side view of a sectioned compressed air spray gun illustrating a digital electronic air pressure gauge according to the invention mounted on a compressed air spray gun at a trigger operated fluid valve.
Figure 6B:
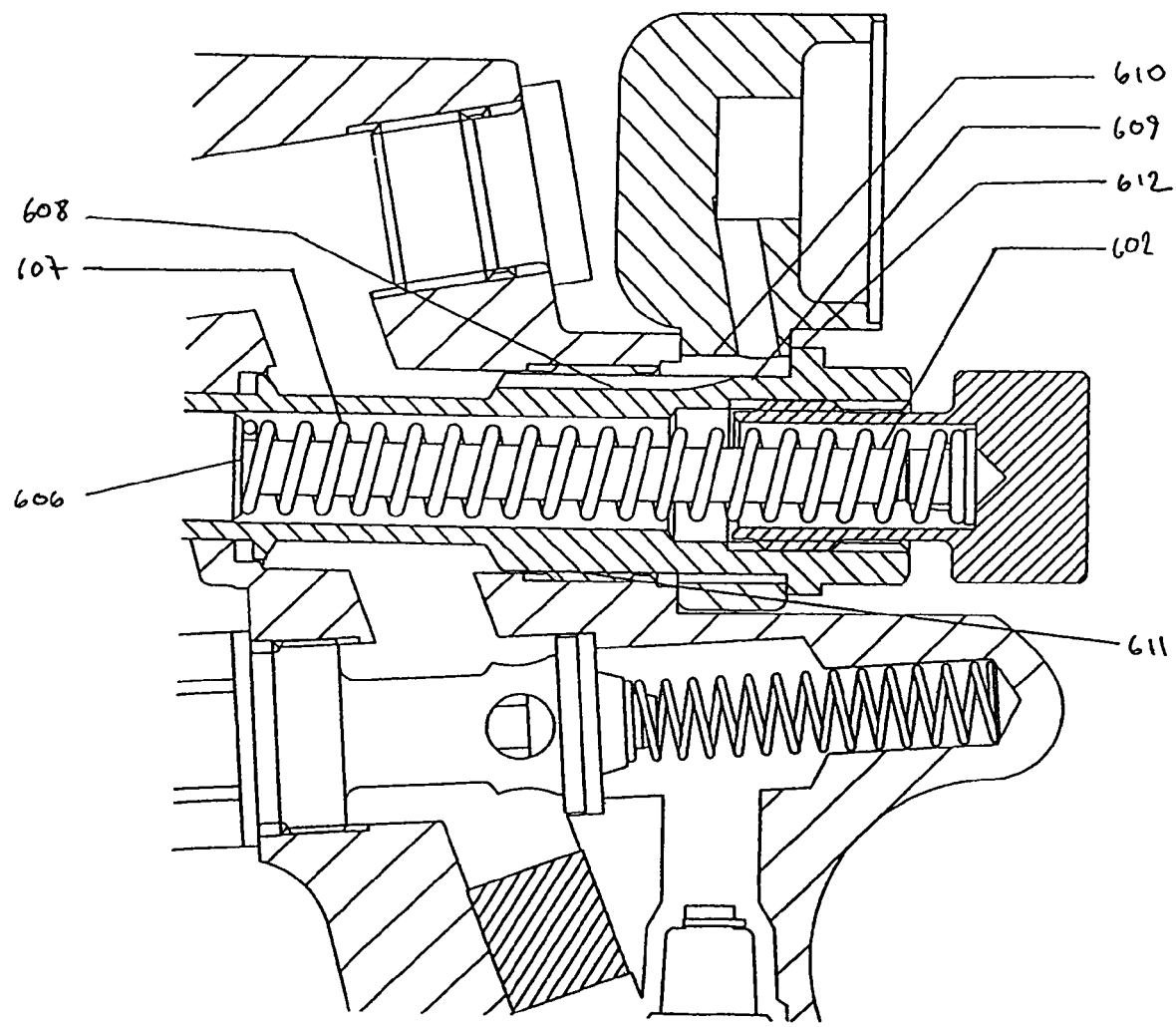

As shown in FIGS. 6a and 6b, the pressure gauge 109 can be mounted on a compressed air spray gun in a similar manner at the trigger operated fluid valve 107. The trigger operated fluid valve 107 comprises a needle 601, including a first needle end (not shown) terminating at an apex and a second needle end 602, and a first shoulder (not shown) located approximately mid-way between the first (not shown) and second 602 needle ends of the needle. The trigger operated fluid valve 107 further comprises a fluid valve bushing 603, which fits over the needle 601, including first 604 and second 605 fluid valve bushing ends. The second fluid valve bushing end 605 is capped with the adjustable threaded end cap 119. The first fluid valve bushing end 604 terminates adjacent the trigger 105. Around a portion of the needle 601 bounded by the adjustable threaded end cap 119 and a second shoulder 606 on the needle 601 lies a spring 607. The fluid valve bushing 603 extends through the gun body 101

When the spring 607 is in a relaxed state, the first needle end (not shown) blocks the fluid discharge orifice (not shown). On manually squeezing the trigger 105, a face (not shown) on the trigger 105 impinges on the first shoulder (not shown) forcing the needle 601 to move away from and thereby to progressively unblock the fluid discharge orifice (not shown) compressing the spring 607.

FIG. 6b shows that the fluid valve bushing 603 is provided with a fluid valve bushing channel 608 on the exterior surface of the fluid valve bushing 609 permitting communication between the interior space 102 and a fluid valve annular space 610 formed in identical fashion as described hereinabove for the spreader valve 103.

The pressure gauge 109 is mounted onto the spray gun by passing the fluid valve bushing 603 through the mounting fixture bore 213 and threading the fluid valve bushing 603 into a threaded bore 611 located in the first end of the gun body 116 below the spreader valve 103. The pressure gauge 109 is thereby clamped between a first surface defined by the exterior surface of the gun body adjacent the threaded bore 611 and a second surface defined by a fluid valve bushing shoulder 612. The fluid valve bushing 603 and needle 601 are adapted to be longer in the present invention than typically used when not mounting the pressure gauge 109 of the invention. In another embodiment, the fluid valve bushing 603 and needle 601 remain unchanged in length in the present invention. In the latter case, only the fluid valve bushing 603 need be adapted and modified to mount the pressure gauge 109 to the spray gun by, for example, the provision of a removable ring located between the knurled nut 406 and the second end of the spreader valve bushing 413. The pressure gauge 109 is mounted on the spray gun in place of the removable ring.

Figure 7:
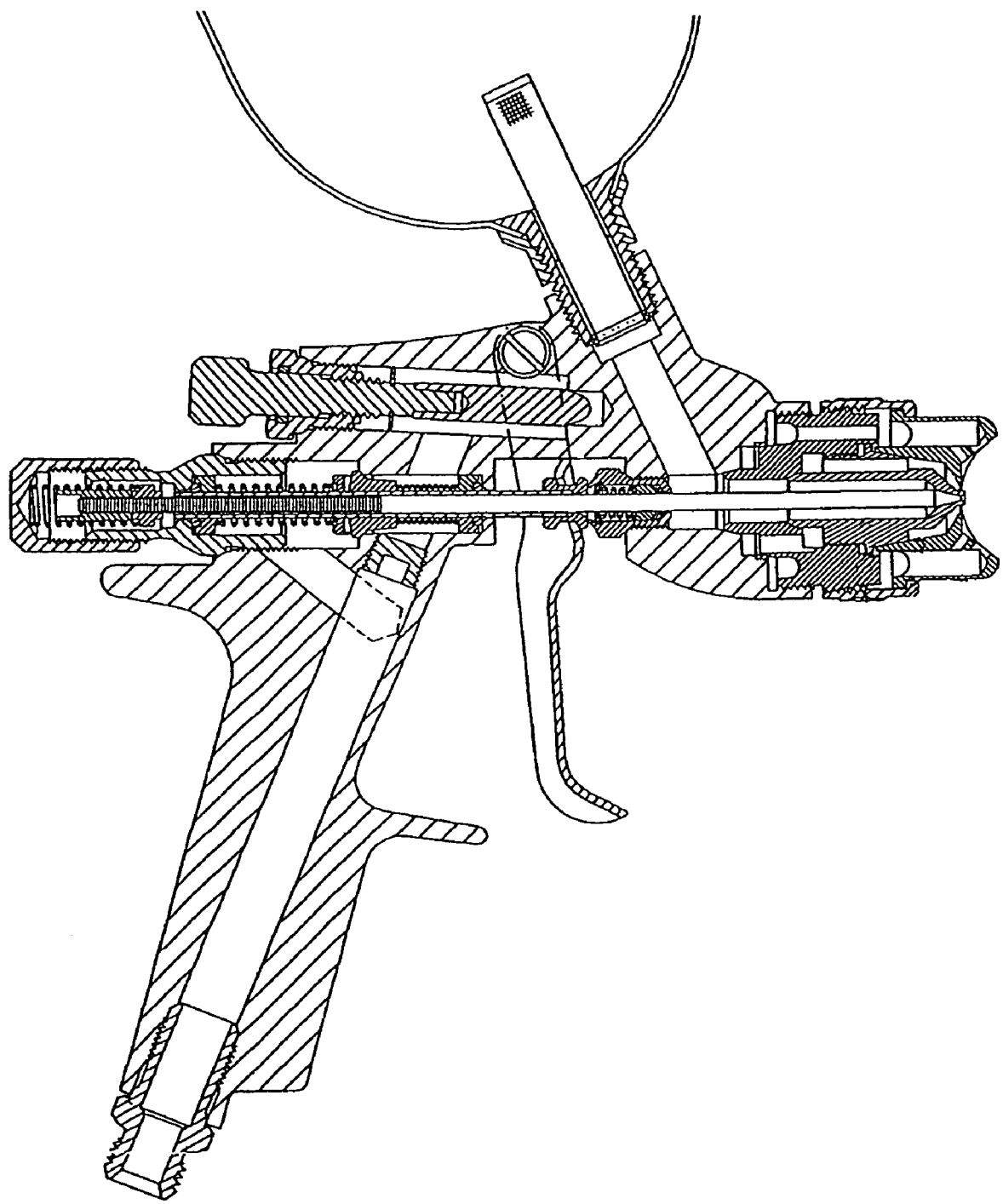
FIG. 7 shows a side cross-section of a compressed air spray gun comprising concentric trigger operated shut off and trigger operated fluid valves.

The pressure gauge 109 can also be mounted, in a similar manner as described hereinabove, on spray guns of alternative design and layout. Such spray guns include that illustrated in DE 100 31 858 A where the longitudinal axis of the spreader valve is substantially orthogonal to the plane of the spray gun. The trigger operated fluid valve of the spray gun is in a similar location to that shown in FIG. 1. The compressed air inlet pressure reducing valve is, however, sited on the gun body between the trigger operated fluid valve and a handle pendant from one end of the gun body. Another design of gun on which the pressure gauge of the invention can be mounted is that shown in FIG. 7 where the trigger operated shut off valve and trigger operated fluid valve are concentric. A further spray gun layout suitable for accommodating the pressure gauge of the invention is a spray gun combining concentric trigger operated compressed air and trigger operated fluid valves with a spreader valve whose longitudinal axis is substantially orthogonal to the plane of the spray gun.

It will be appreciated that various modifications and changes may be made to the above described preferred embodiments of the invention without departing from the invention as set out in the following claims.

The invention claimed is:

1. A retrofittable pressure gauge for a spray gun, said pressure gauge comprising:
   a case having a pressure chamber;
   a pressure sensor located in the pressure chamber; and
   a mounting fixture attached to the case and having a through bore for mounting the pressure gauge on the spray gun, wherein the mounting fixture further comprises a passageway other than said through bore, said passageway providing fluid communication between the pressure chamber and the bore;
   wherein a dimension of said case measured in an axial direction of said through bore is greater than an entire axial extent of said through bore.

2. The pressure gauge according to claim 1, further comprising a liquid crystal display connected to the pressure sensor.

3. The pressure gauge according to claim 2, wherein said display is oriented in the axial direction of said through bore.

4. The pressure gauge according to claim 1, further comprising a printed circuit board mounting a microprocessor connected to the pressure sensor via said printed circuit board.

5. The pressure gauge according to claim 1, wherein the pressure chamber is formed as a cavity in said case, an opening of said cavity being closed by a cover so that said pressure chamber is in fluid communication with an outside of said case only through said passageway and said bore.

6. The pressure gauge according to claim 5, wherein the mounting fixture and the case are integrated in a single body which extends seamlessly, continuously from said case to said mounting fixture.

7. The pressure gauge according to claim 6, wherein the passageway extends obliquely relative to an axial direction of said through bore.

8. The pressure gauge according to claim 1, wherein the pressure chamber is formed as a cavity in said case, an opening of said cavity being closed by a cover, the pressure sensor being sized so as to be passable through the opening of said cavity, but not through said passageway.

9. The pressure gauge according to claim 1, further comprising a power source and a display unit all enclosed within said case and connected to said pressure sensor;
   wherein the pressure chamber is formed as a cavity in said case, an opening of said cavity is closed by a transparent cover through which at least said display unit is visible.

10. The pressure gauge according to claim 1, further comprising an activating element for activating said pressure sensor.

11. The pressure gauge according to claim 10, wherein said activating element comprises a conductive member moveable with a cavity having on a wall thereof a plurality of electrical contacts, said conductive member having first and second positions within said cavity in which said conductive member connects first and second pair of said electrical contacts, respectively.

12. The pressure gauge according to claim 11, wherein said conductive member is a metallic ball and said wall is a printed circuit board;
   said pressure gauge further comprising a microprocessor mounted on said printed circuit board and connected to the contacts of said activating element and said pressure sensor via said printed circuit board.

13. The pressure gauge according to claim 1, wherein the mounting fixture and the case are integrated in a single body which extends seamlessly, continuously from said case to said mounting fixture.

14. The pressure gauge according to claim 1, wherein the passageway extends obliquely relative to an axial direction of said through bore.

15. The pressure gauge according to claim 1, wherein said through bore extends between opposite surfaces of said mounting fixture;
   said opposite surfaces are parallel; and
   said through bore has a constant diameter throughout the entire axial extent thereof.

16. The pressure gauge according to claim 15, wherein said mounting fixture further comprises two side surfaces connecting the opposite surfaces and extending from opposite sides of said case toward each other and away from said case; and said through bore is formed at an apex of said mounting fixture where said side surfaces meet.

* * * * *